(12) United States Patent
Compton et al.

(10) Patent No.: US 8,483,868 B2
(45) Date of Patent: Jul. 9, 2013

(54) METHOD TO AUDIT PORTABLE CASSETTES REMOVEABLY DISPOSED IN A DATA STORAGE LIBRARY COMPRISING A PASS-THROUGH ACCESSOR

(75) Inventors: Matthew C. Compton, Tucson, AZ (US); Louis D. Echevarria, Tucson, AZ (US); Stefan Lehmann, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/460,664

(22) Filed: Apr. 30, 2012

(65) Prior Publication Data

US 2012/0213616 A1    Aug. 23, 2012

Related U.S. Application Data

(63) Continuation of application No. 12/464,758, filed on May 12, 2009, now Pat. No. 8,175,745.

(51) Int. Cl.
*G06F 7/00* (2006.01)

(52) U.S. Cl.
USPC ........... 700/215; 700/214; 700/213; 700/218; 700/228

(58) Field of Classification Search
None
See application file for complete search history.

(56) References Cited

U.S. PATENT DOCUMENTS

| | | | |
|---|---|---|---|
| 5,898,593 | A | 4/1999 | Baca et al. |
| 7,079,978 | B2 * | 7/2006 | Goodman et al. ............ 702/182 |
| 7,920,940 | B2 | 4/2011 | Bates et al. |
| 7,941,242 | B2 * | 5/2011 | Colvig et al. ................. 700/213 |
| 2005/0063089 | A1 | 3/2005 | Starr et al. |
| 2007/0162180 | A1 | 7/2007 | Goodman et al. |
| 2009/0234500 | A1 | 9/2009 | Tanaka |
| 2010/0080091 | A1 | 4/2010 | Compton et al. |
| 2011/0038075 | A1 | 2/2011 | Compton et al. |

* cited by examiner

*Primary Examiner* — Gene Crawford
*Assistant Examiner* — Yolanda Jones
(74) *Attorney, Agent, or Firm* — Dale F. Regelman; Quarles & Brady LLP

(57) ABSTRACT

A method to audit portable cassettes removeably disposed in a data storage library comprising a plurality of storage slots, a plurality of portable cassettes removeably disposed in one or more of said plurality of storage slots, and a pass-through accessor comprising a moveable fixturing apparatus, wherein the pass-through accessor is moveably disposed in said data storage library. The method disposes the pass-through accessor adjacent a first one of said plurality of storage slots, removes a first portable cassette from the first storage slot, and attaches the first portable cassette to a first fixturing assembly disposed on the fixturing apparatus. The method then removes a second portable cassette from the first storage slot, and attaches the second portable cassette to a second fixturing assembly disposed on the fixturing apparatus.

8 Claims, 17 Drawing Sheets

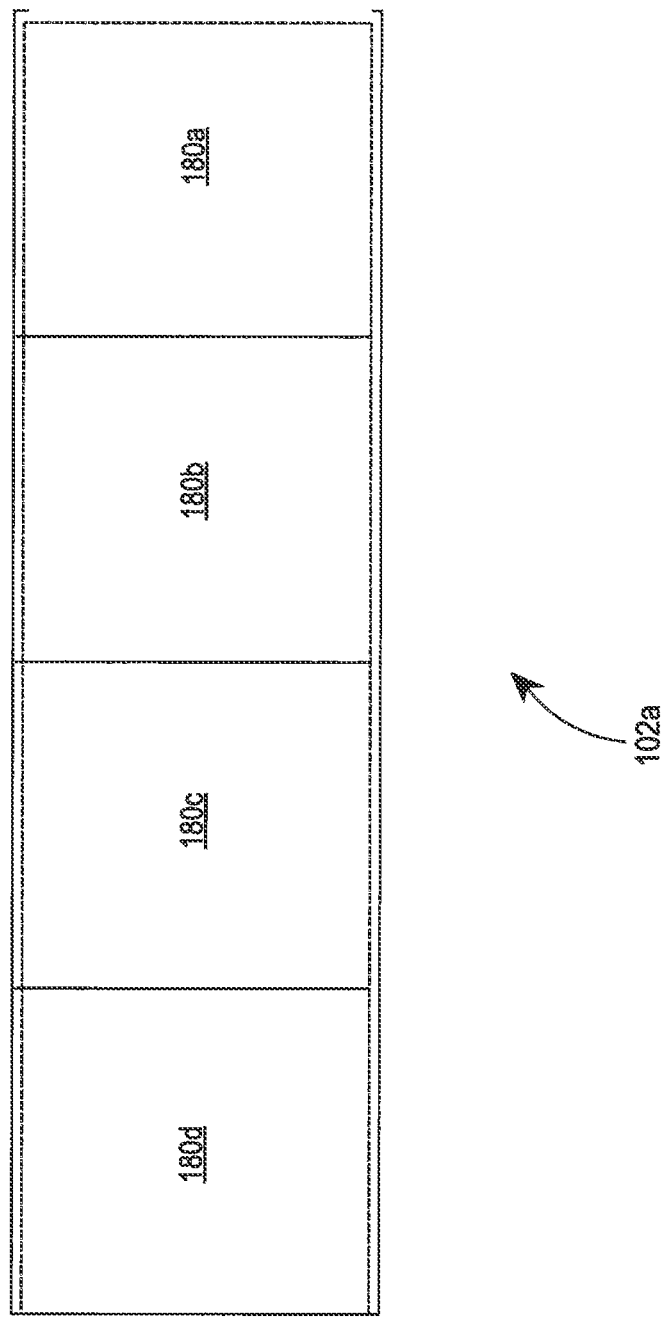

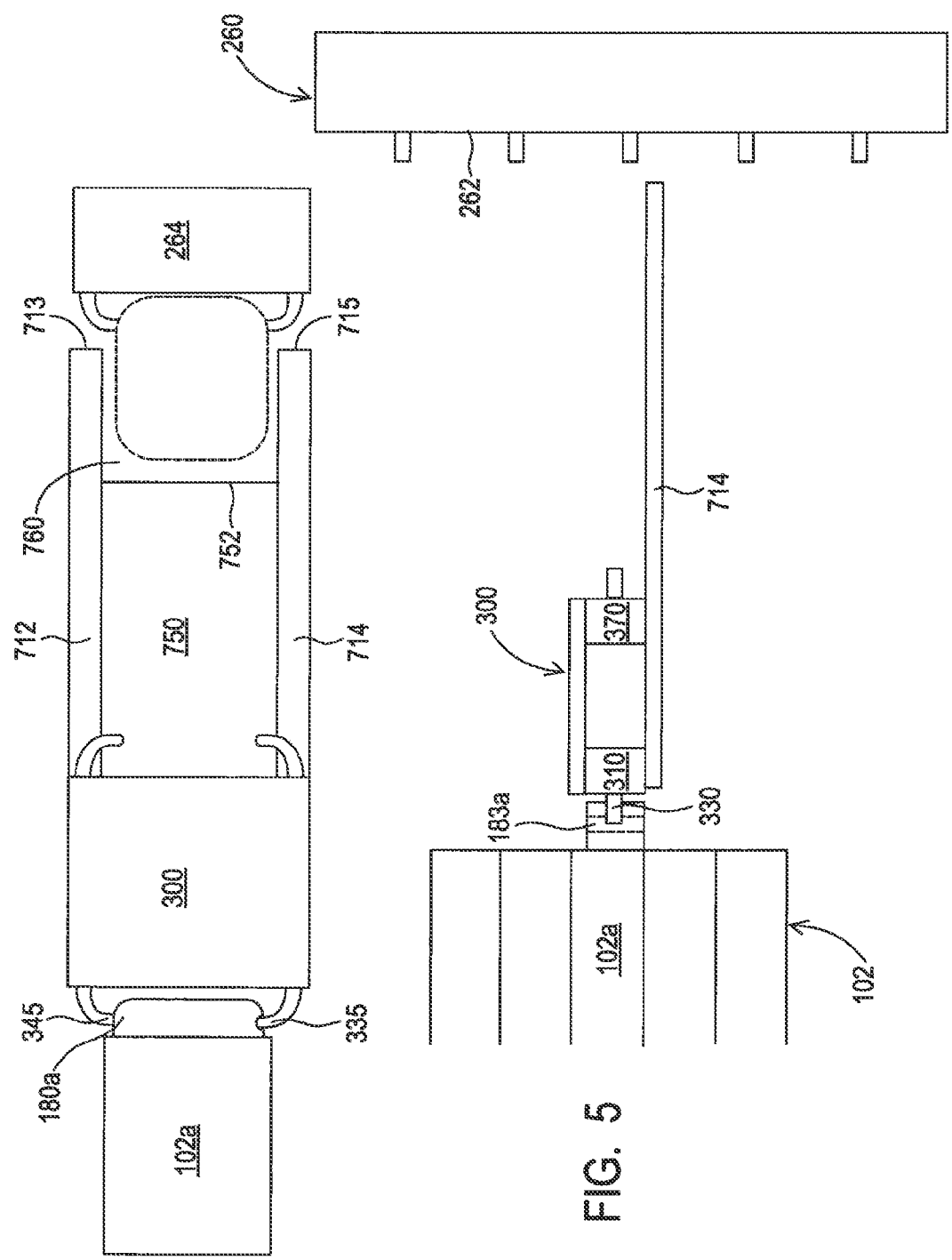

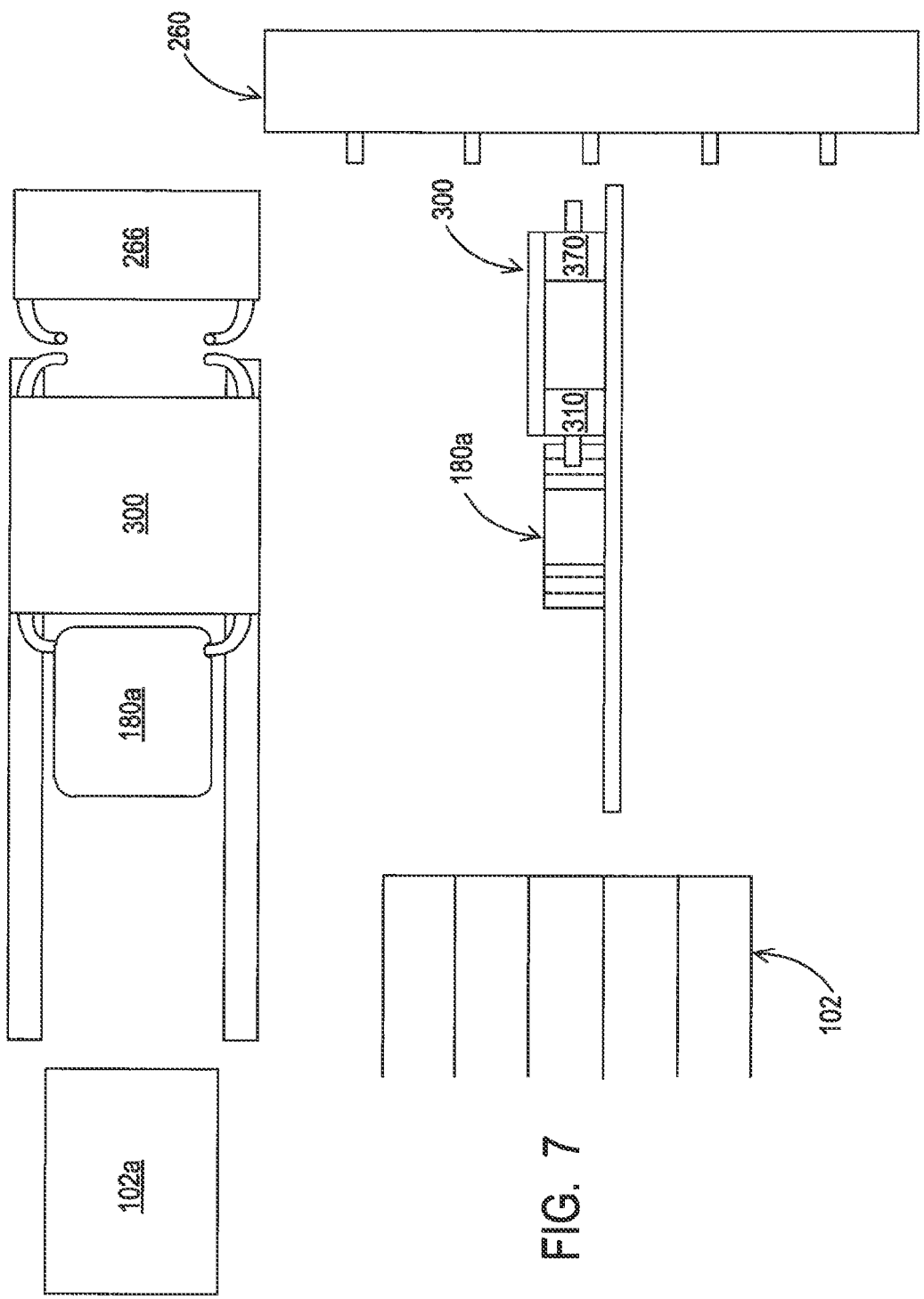

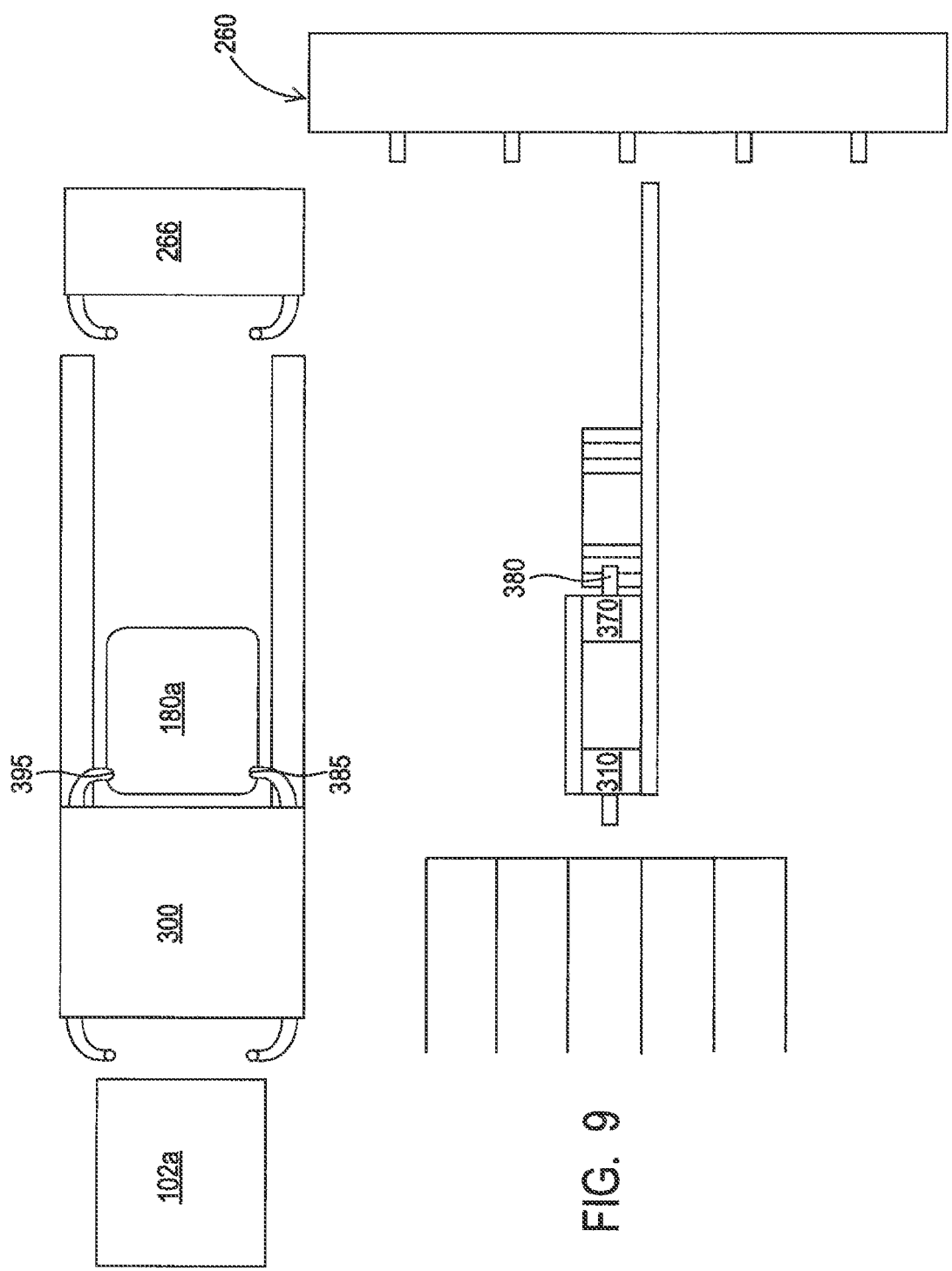

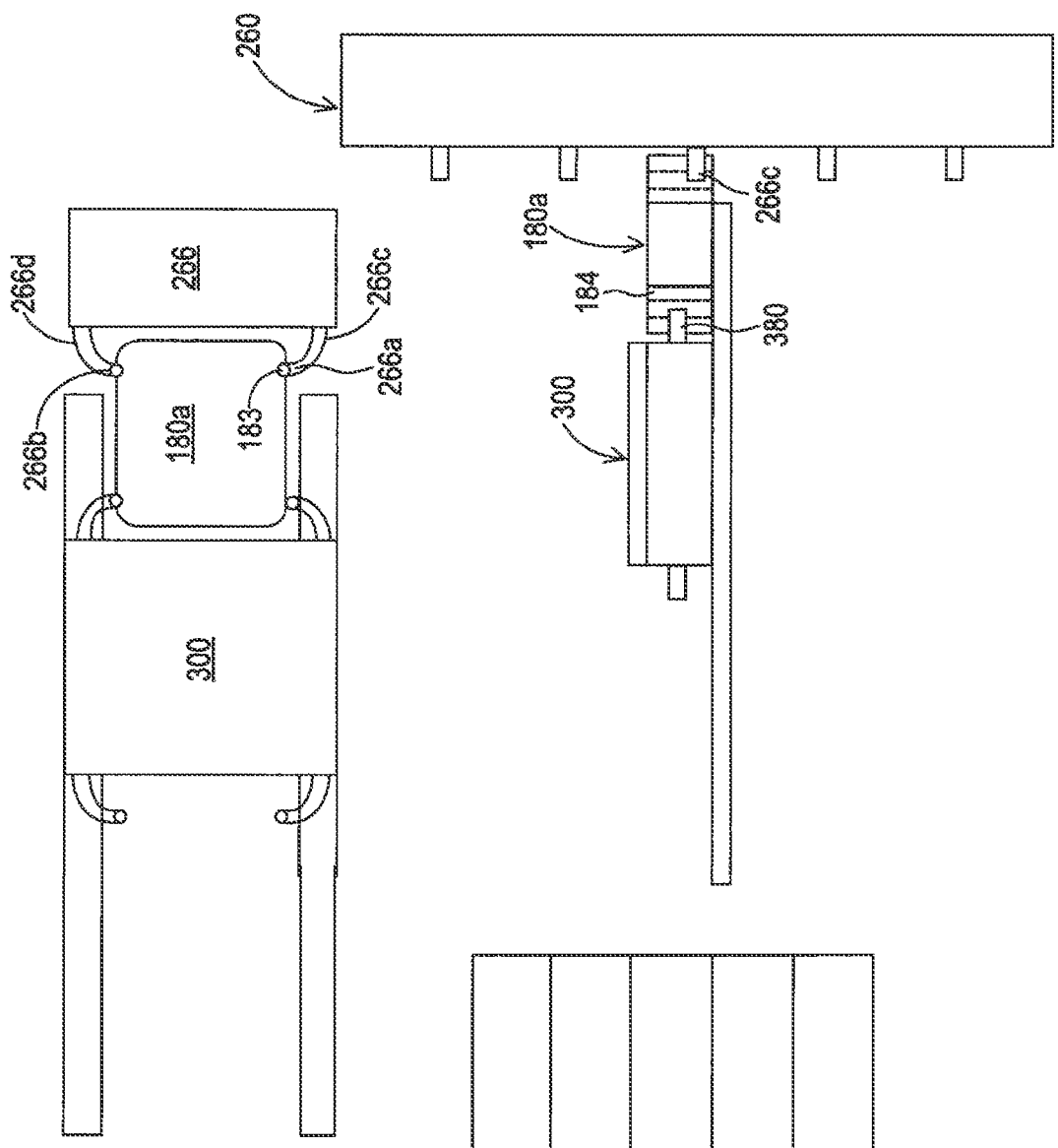

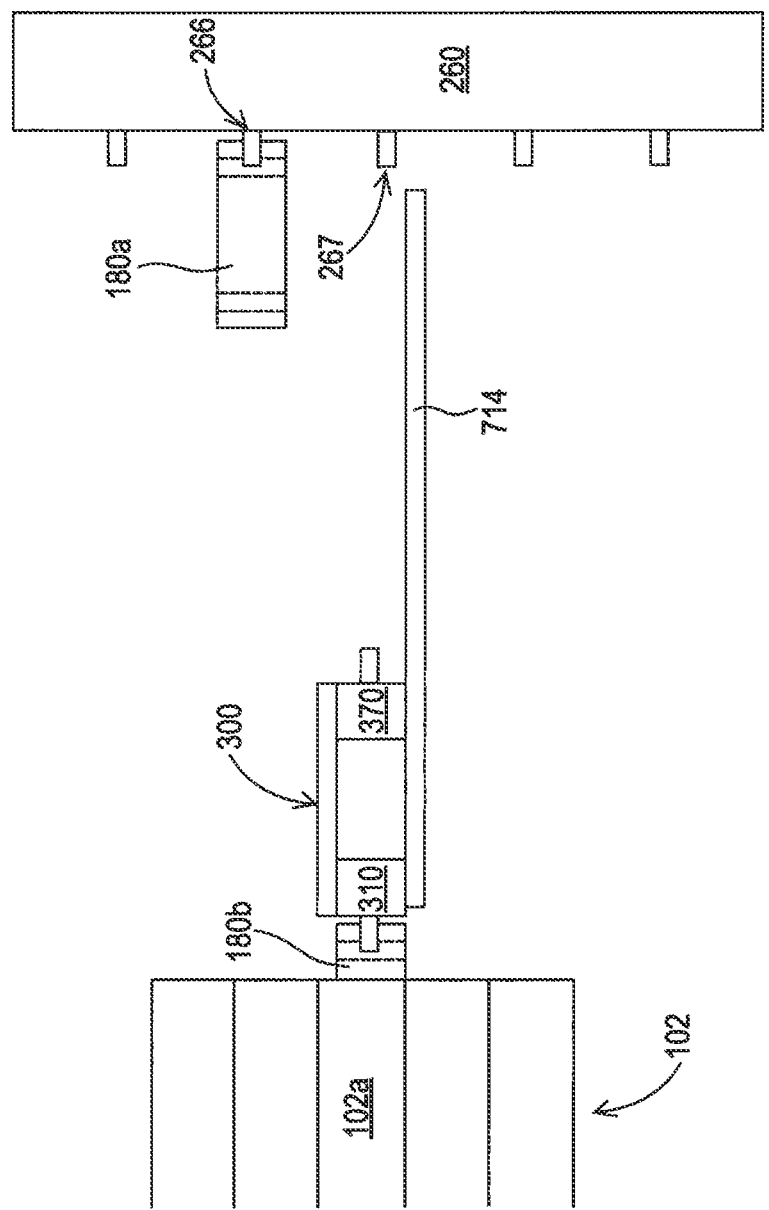

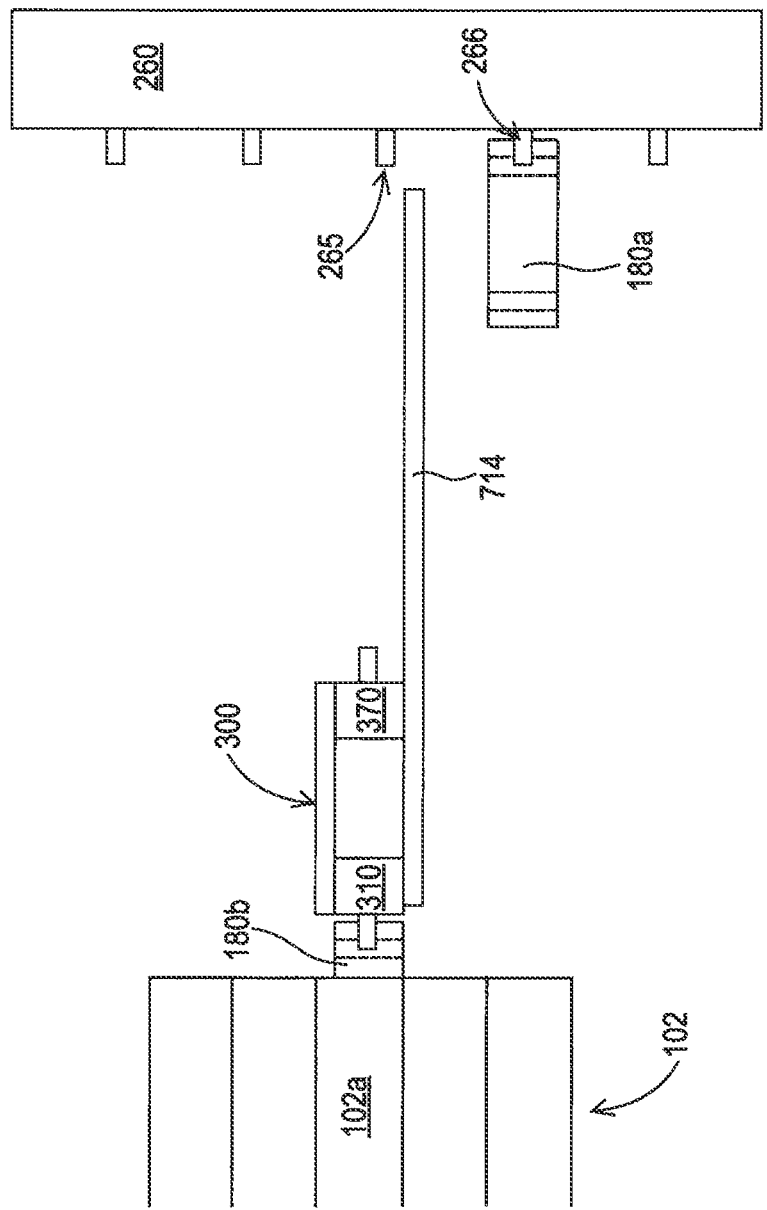

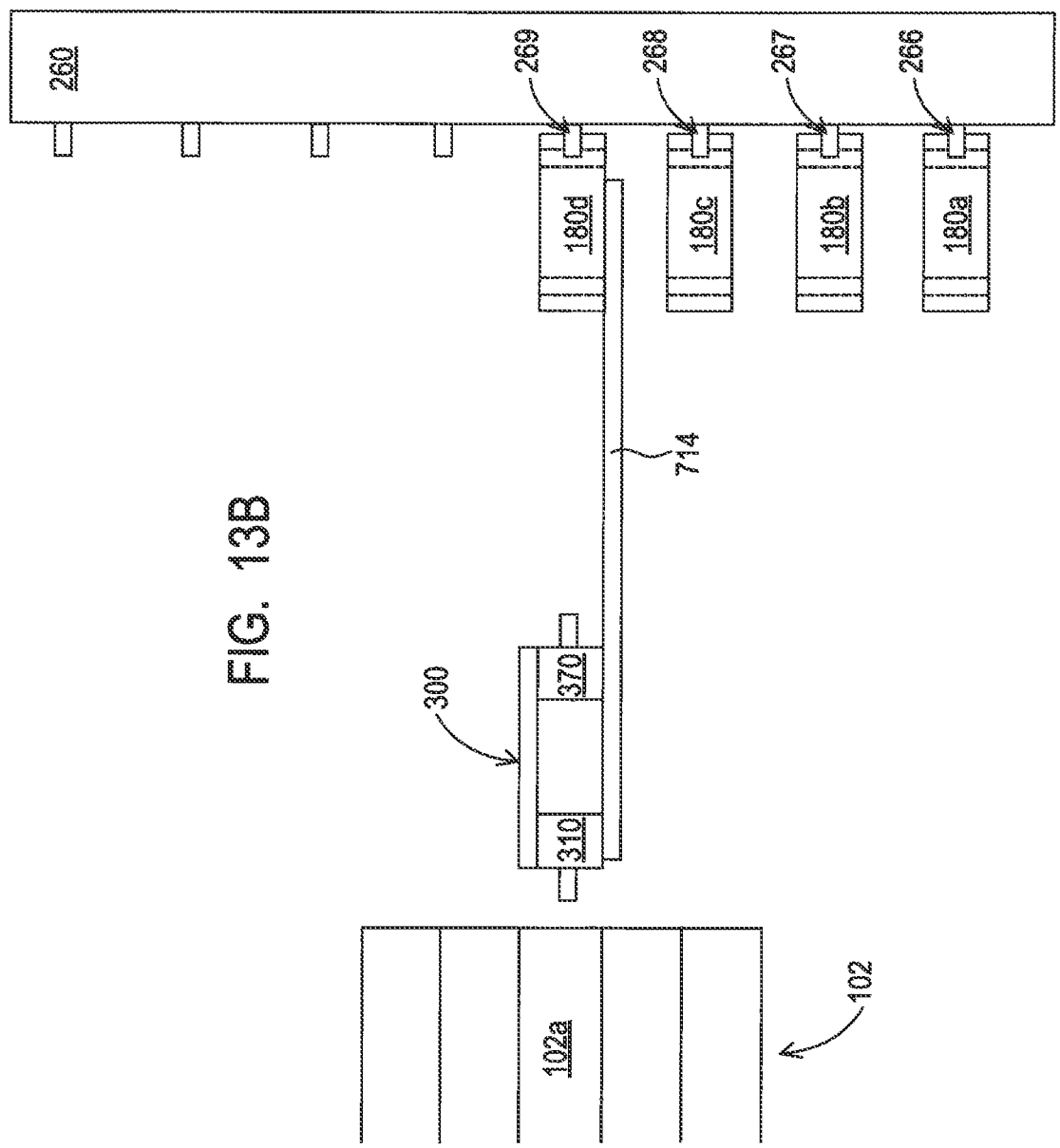

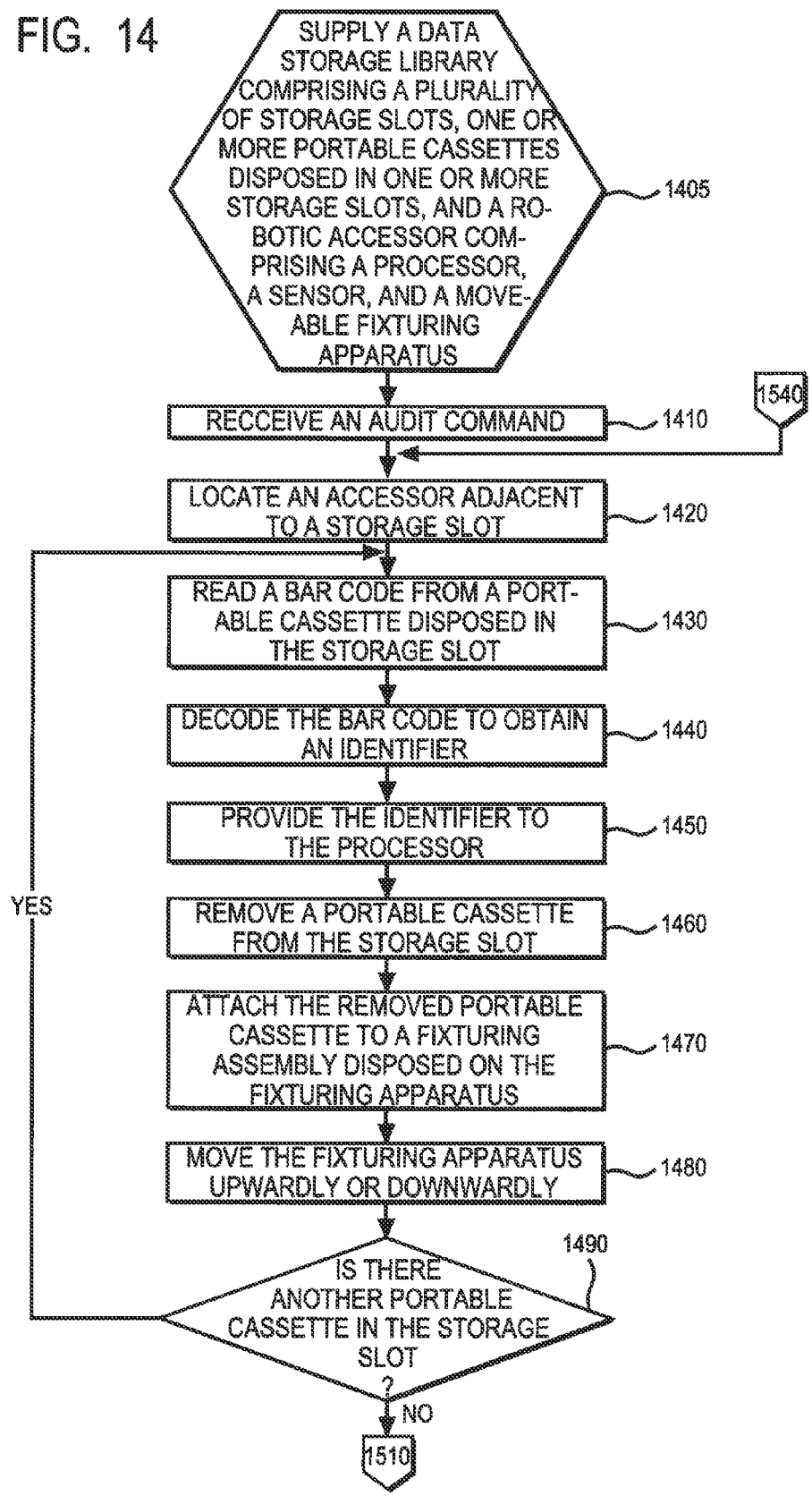

METHOD TO AUDIT PORTABLE CASSETTES REMOVEABLY DISPOSED IN A DATA STORAGE LIBRARY COMPRISING A PASS-THROUGH ACCESSOR

CROSS-REFERENCE TO RELATED APPLICATIONS

This application is a Continuation application claiming priority to the application having Ser. No. 12/464,758 filed May 12, 2009, which is hereby incorporated by referenced herein.

FIELD OF THE INVENTION

This invention relates to a method to audit portable cassettes removeably disposed in a data storage library comprising a pass-through accessor.

BACKGROUND OF THE INVENTION

Computing devices generate information. It is known in the art to store such information using a plurality of data storage cassettes disposed in an automated data storage library comprising a plurality of storage slots. Certain deep cell storage slots are capable of housing a plurality of portable data storage cassettes.

SUMMARY OF THE INVENTION

A method is provided to audit portable cassettes removeably disposed in a data storage library comprising a plurality of storage slots, one or more portable cassettes removeably disposed in each of one or more of said plurality of storage slots, and a pass-through accessor comprising a moveable fixturing apparatus to store one or more portable cassettes, wherein the pass-through accessor is moveably disposed in said data storage library.

The method disposes the pass-through accessor adjacent a first one of said plurality of storage slots, reads a first identifier from a first portable cassette disposed in said first storage slot, removes the first portable cassette from the first storage slot, and attaches the first portable cassette to a first fixturing assembly disposed on the fixturing apparatus.

The method then reads a second identifier from a second portable cassette disposed in said first storage slot, removes the second portable cassette from the first storage slot, and attaches the second portable cassette to a second fixturing assembly disposed on the fixturing apparatus.

BRIEF DESCRIPTION OF THE DRAWINGS

The invention will be better understood from a reading of the following detailed description taken in conjunction with the drawings in which like reference designators are used to designate like elements, and in which:

FIG. 1D is a block diagram showing a plurality of portable data storage cassettes removeably disposed within a storage slot disposed in the data storage library of FIG. 1A;

FIG. 4 shows a top view of Applicants' gripper assembly disposed at a first end of a set of parallel rails, wherein the gripper assembly comprises two sets of gripping members, and wherein a first set of gripping members are shown releaseably attached to a portable data storage cassette disposed in a storage slot;

FIG. 5 is a side view showing the elements of FIG. 4;

FIG. 6 is a top view showing Applicants' gripper assembly disposed at a second and opposing end of the set of parallel rails of FIG. 4;

FIG. 7 is a side view showing the elements of FIG. 6;

FIG. 8 shows the gripper assembly repositioned at the first end of the set of parallel rails with the second set of gripping members releaseably attached to the portable data storage cassette;

FIG. 9 is a side view showing the elements of FIG. 8;

FIG. 10 shows the portable data storage cassette releaseably attached to Applicants' gripper assembly using the second set of gripping members and to a fixturing assembly disposed on a fixturing apparatus element of Applicants' pass-through accessor;

FIG. 11 is a side view showing the elements of FIG. 10;

FIG. 12A shows the fixturing apparatus 266 of FIG. 11 having been moved upwardly, and the gripper assembly releaseably attached to second portable data storage cassette disposed within the storage slot of FIG. 1D;

FIG. 12B shows the fixturing apparatus 266 of FIG. 11 having been moved downwardly, and the gripper assembly releaseably attached to second portable data storage cassette disposed within the storage slot of FIG. 1D;

FIG. 13B shows the plurality of portable cassettes of FIG. 1D having been removed from storage slot 102(a) and each attached to a different fixturing assembly disposed on fixturing apparatus 260, wherein fixturing apparatus 260 was moved downwardly with each attachment operation;

FIG. 14 summarizes the initial steps of Applicants' method to audit portable cassettes disposed in data library 100.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
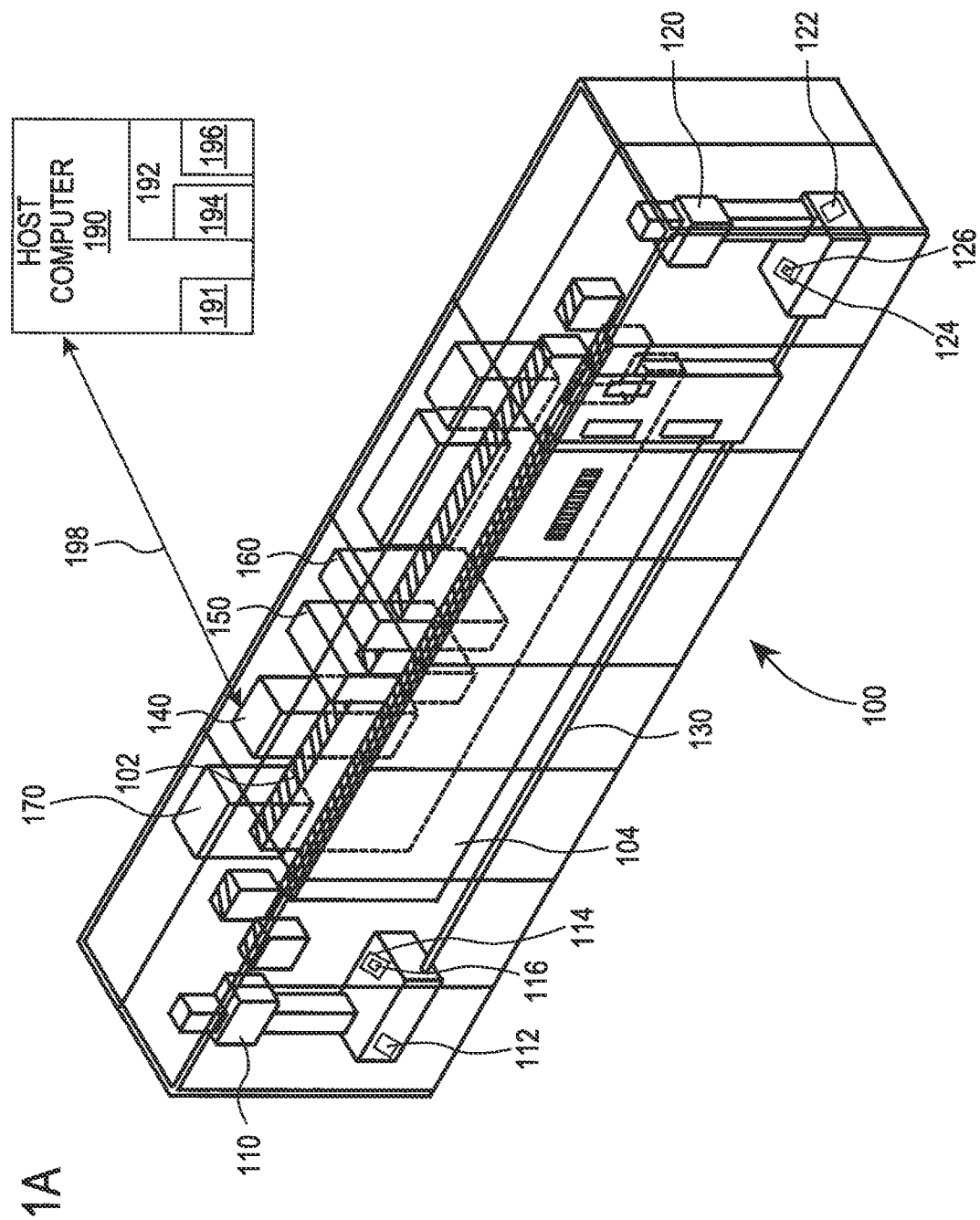
FIG. 1A is a perspective view illustrating an embodiment of Applicants' data storage library.

FIG. 1A shows data storage system 100. System 100 includes storage controller 140, data drives 150 and 160, and DASD 170. Host computer 190 communicates with storage system 100 via communication link 198.

System 100 further includes a plurality of portable data storage cassettes removeably disposed in a plurality of storage slots disposed in first storage wall 102 and/or second storage wall 104.

Data storage library 100 further comprises at least one pass-through accessor 110/120 for transporting a designated portable data storage cassette between a storage slot disposed in storage wall 102/104 and data drive 150 or 160. Pass-through accessors 110 and 120 are moveably disposed along rail 130.

Figure 1B:
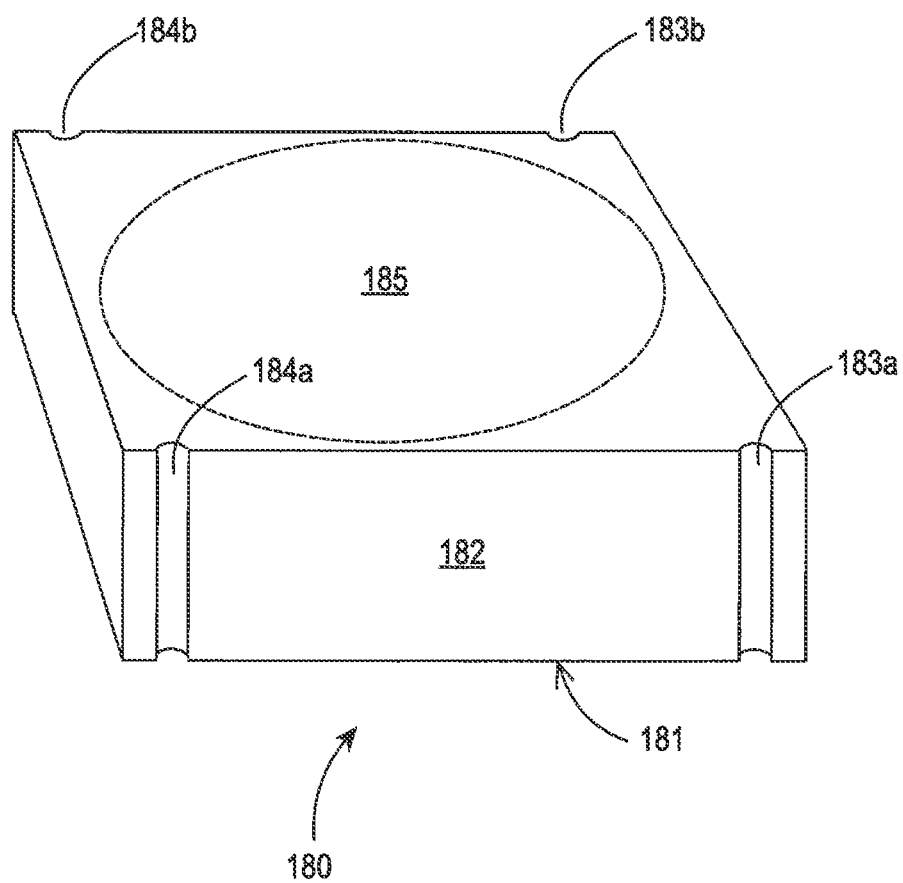
FIG. 1B is a perspective view illustrating Applicants' portable data storage cassette.

Referencing FIG. 1B, a plurality of portable data storage cassettes 180 are removeably disposed within Applicants' data storage system each comprising an information storage medium disposed therein. In the illustrated embodiment of FIG. 1B, each portable data storage cassette 180 comprises a housing 181 and an information storage medium 185 disposed within housing 181. In certain embodiments, the information storage medium 185 is removeably disposed within housing 181. In an illustrated embodiment of FIG. 1B, housing 181 is formed to include fixturing grooves 183*a* and 184*a* formed in side 182, and fixturing grooves 183*b* and 184*b* formed in an opposing side. In other embodiments, Applicants' housing 181 is formed to include a plurality of fixturing apertures extending inwardly, wherein a plurality of fixturing apertures replace each of the four fixturing grooves.

In the illustrated embodiment of FIG. 1A, data storage system 100 is in communication with host computer 190. As a general matter, host computer 190 comprises a computing device, such as a mainframe, personal computer, workstation, and combinations thereof, including an operating system 194 such as Windows, AIX, Unix, MVS, LINUX, etc. In the illustrated embodiment of FIG. 1A, host computer 190 further comprises instructions 196 encoded in a computer readable medium 192, wherein those instructions comprise computer readable program code to implement Applicants' method using Applicants' pass-through accessor.

Pass-through accessor 110 or 120 can receive a signal from host computer 190 designating one of the plurality of portable data storage cassettes, retrieve that designated portable data storage cassette from a storage slot, transport that designated portable data storage cassette to a designated location, such as and without limitation data drive 150 or 160.

Figure 1C:
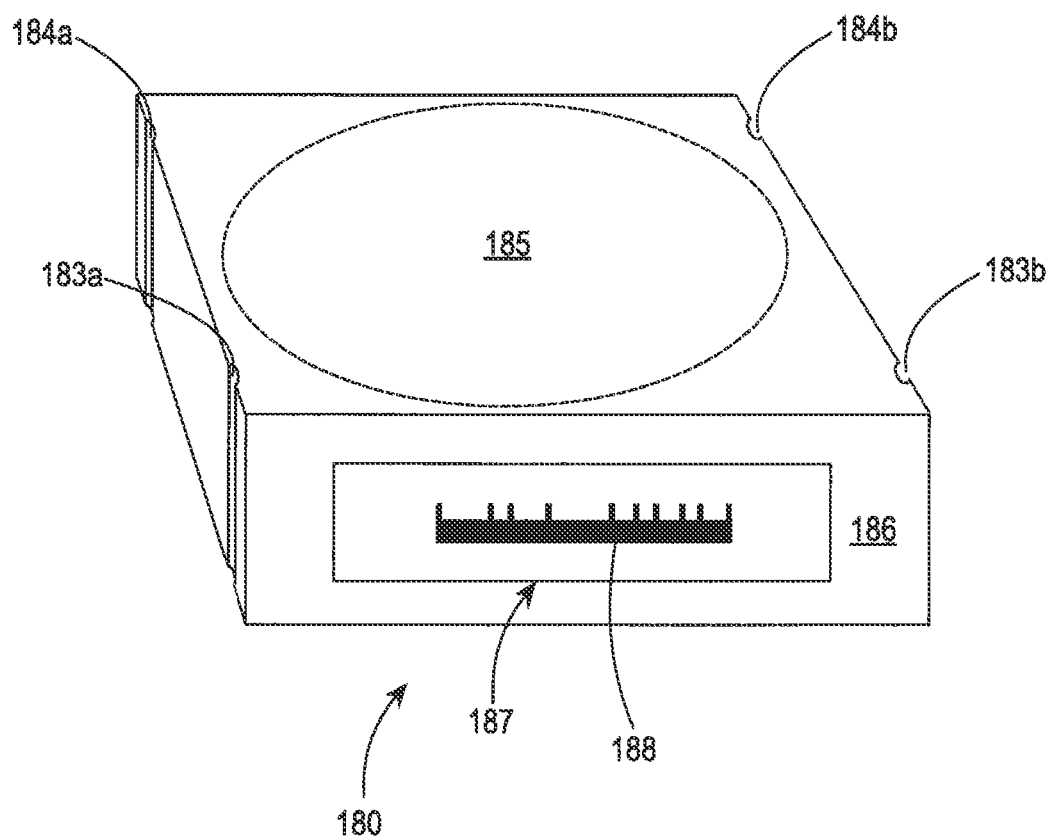
FIG. 1C is a perspective view illustrating an identifier disposed on a front portion of the portable data storage cassette of FIG. 1B.

Pass-through accessor 110 and pass-through accessor 120 comprise a processor 112 and 122, respectively, and computer readable medium 114 and 124, respectively, and instructions 116 and 126, respectively encoded in that computer readable medium 114 and 124, respectively. Processor 110 utilizes instructions 116 to implement Applicants' method utilizing pass-through accessor 110. Processor 120 utilizes instructions 126 to implement Applicants' method utilizing pass-through accessor 120. FIG. 1C shows portable data storage cassette comprising an identifier 188. In certain embodiments, that identifier 188 comprises a bar code. In the illustrated embodiment of FIG. 1C, identifier 188 is disposed on a label 187, wherein label 187 is disposed on a front portion of portable data storage cassette 180.

In other embodiments, label 187 comprises an RFID tag. In these embodiments, in response to an RFID interrogating signal, RFID tag 187 wirelessly provides identifier 188.

In certain embodiments one or more storage slots of wall of storage slots 102, and/or wall of storage slots 104, can accommodate more than one portable data storage cassette. FIG. 1D is a top view showing four portable data storage cassettes, namely portable data storage cassettes 180*a*, 180*b*, 180*c*, and 180*d*, disposed in one storage slot 102*a*, wherein storage slot 102*a* comprises one of a plurality of storage slots disposed in storage wall 102 (FIG. 1A). In the illustrated embodiment of FIG. 1D, portable cassette 180*a* is disposed adjacent an open end in storage slot 102*a*.

In certain embodiments, the plurality of portable data storage cassettes 180 removeably disposed within Applicants' data storage system each comprise a magnetic tape data storage medium 185. In certain embodiments, the plurality of portable data storage cassettes 180 removeably disposed within Applicants' data storage system each comprise an optical storage medium 185 disposed therein. In certain embodiments, the plurality of portable data storage cassettes 180 removeably disposed within Applicants' data storage system each comprise an electronic storage medium 185 disposed therein. In certain embodiments, the plurality of portable data storage cassettes 180 removeably disposed within Applicants' data storage system each comprise a holographic storage medium 185 disposed therein.

Figure 2A:
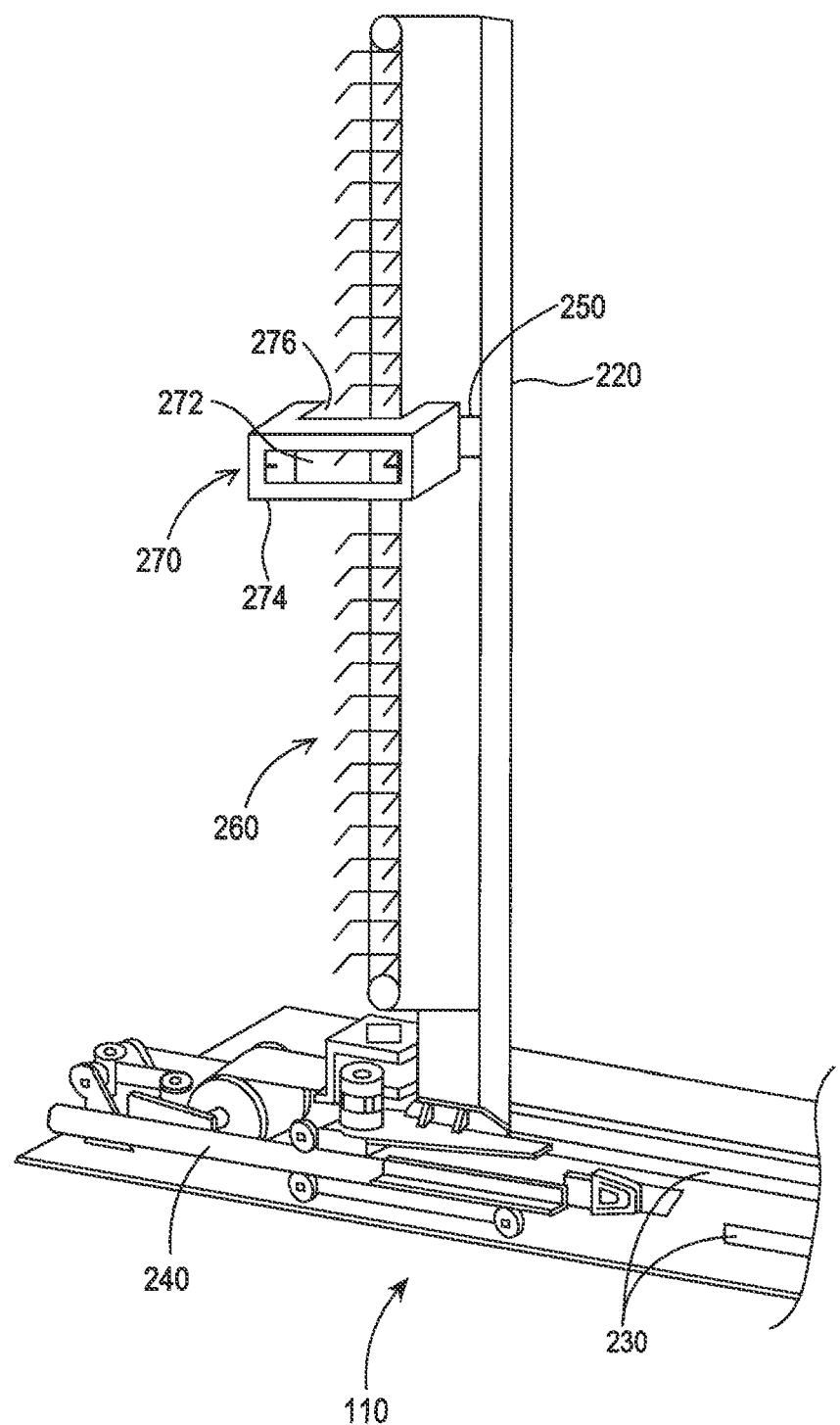
FIG. 2A is a perspective view illustrating Applicants' pass-through accessor moveably disposed in the data storage library of FIG. 1A.
Figure 2B:
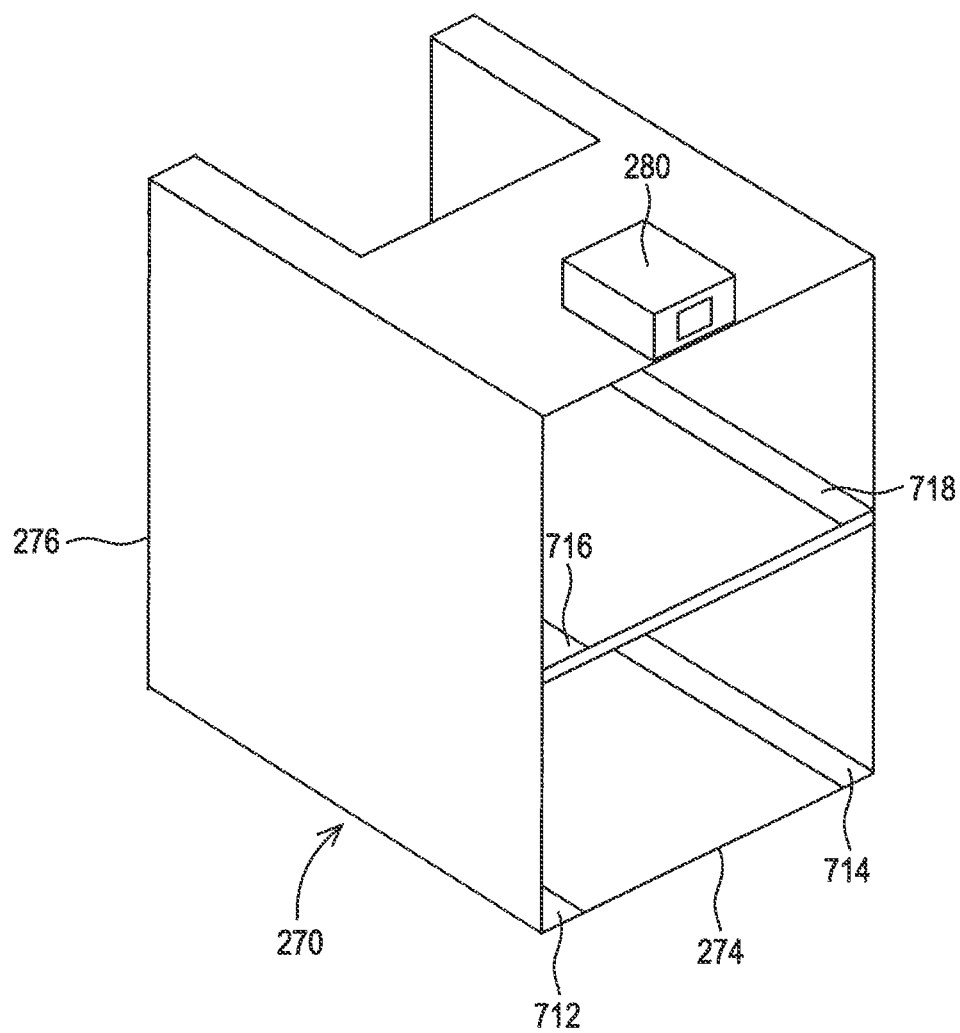
FIG. 2B illustrates a housing element of Applicants' pass-through accessor.

Referring now to FIGS. 1A, 2A, and 2B, Applicants' pass-through accessors 110 and 120 each comprise a vertical pillar 220, a lifting servo section 250 moveably disposed on pillar 220, a fixturing apparatus 260 moveably attached to vertical pillar 220, and housing 270 disposed on lifting servo section 250. In the illustrated embodiment of FIGS. 2A and 2B, housing 270 comprises a "U-shape" defined by front 274 and rear 276. Front 274 is formed to include aperture 272 extending therethrough.

Applicants' pass-through accessors 110 and 120 each further comprise a sensor 280. In certain embodiments, sensor 280 comprises a bar code reader. As those skilled in the art will appreciate, a bar code scanner comprises an electronic device for reading printed bar codes, and comprises a lens and a photo conductor translating optical impulses into electrical ones. In certain embodiments, sensor 280 further comprises decoder circuitry analyzing a barcode's image data provided by the photo conductor and sending bar code's content to processor 112 (FIG. 1A) and/or processor 124 (FIG. 1A). In certain embodiments, sensor 180 communicates with processor 112 and/or processor 124 via one or more wireless networks utilizing an IEEE 802.11g (WLAN) protocol and/or an IEEE 802.15.3 (Bluetooth) protocol.

In certain embodiments, sensor 280 utilizes a lasing device as a light source and comprises either a reciprocating mirror or a rotating prism to scan a laser beam back and forth across a bar code. In certain embodiments, a photodiode is used to measure an intensity of the light reflected back from the bar code. In certain embodiments, sensor 280 comprises an array of light sensors. A voltage pattern identical to the pattern in a bar code is generated in sensor 280 by sequentially measuring a voltage across each light sensor in a row. In certain embodiments, sensor 280 comprises a video camera to capture an image of a bar code. Sensor 280 further comprises digital image processing circuitry to decode the bar code.

Fixturing apparatus 260 comprises a plurality of fixturing assemblies attached thereto and extending outwardly therefrom. Fixturing apparatus 260 and housing 270 are rotationally attached to vertical pillar 220. Fixturing apparatus 260 and housing 270 can be rotated to face plurality of storage slots 102 or plurality of storage slots 104.

If a host computer sends a write command and/or a read command (collectively an "I/O command") to data storage library 100, wherein that I/O command designates, for example, portable data storage cassette 180*b* (FIG. 2D). In order to access portable data storage cassette 180*b*, Applicants' pass-through accessor must first remove portable data storage cassette 180*a* (FIG. 2D) from storage slot 102*a* (FIG. 2D), and then portable data storage cassette 180*b* can be removed from storage slot 102*a* and transported to a data storage device, such as data storage device 140 or 150.

In order to access and transport portable data storage cassette 180*b*, Applicants' method first removes portable data storage cassette 180*a* from storage slot 102*a*, pulls that portable data storage cassette into housing 270 through aperture 272, pushes the portable data storage cassette 180*a* outwardly through rear 276, and releaseably attaches portable data storage cassette 180*a* to a fixturing assembly disposed on fixturing apparatus 260. Pass-through accessor 110 can then retrieve portable data storage cassette 180*b* from storage slot 102*a*, and transport data storage cassette 180*b* to a designated data storage device.

Figure 3A:
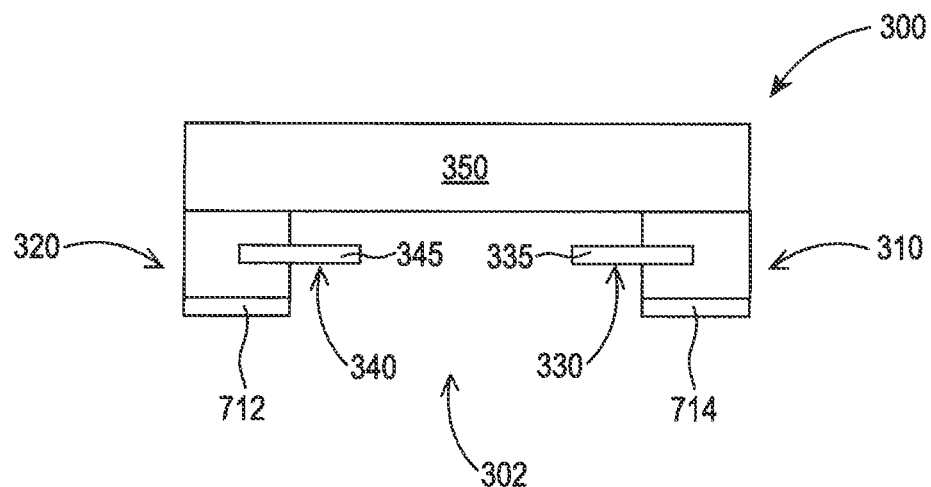
FIG. 3A illustrates one end of Applicants' gripper assembly moveably disposed within Applicants' pass-through accessor.

Referring now to FIG. 3A, Applicants' gripper assembly 300 comprises gripper mechanism 310 and gripper mechanism 320 disposed at a first end 302. Gripper mechanisms 310 and 320 are shown moveably disposed on rails 712 and 714, respectively. Cross-member 350 interconnects gripper mechanism 310 and gripper mechanism 320. Gripper mechanism 310 comprises gripper member 330, wherein gripper member 330 comprises distal end 335. Gripper mechanism 320 comprises gripper member 340, wherein gripper member 340 comprises distal end 345.

Figure 3B:
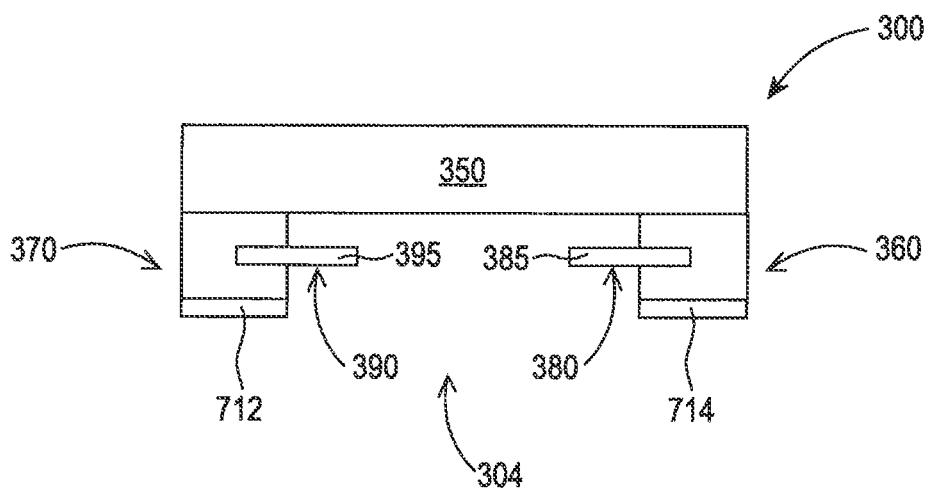
FIG. 3B illustrates an opposing end of Applicants' gripper assembly.

Referring now to FIG. 3B, Applicants' gripper assembly 300 comprises gripper mechanism 360 and gripper mechanism 370 disposed at a second end 304. Gripper mechanisms 370 and 360 are shown moveable disposed on rails 712 and 714, respectively. Gripper mechanism 360 comprises gripper member 380, wherein gripper member 380 comprises distal end 385. Gripper mechanism 370 comprises gripper member 390, wherein gripper member 390 comprises distal end 395.

FIGS. 4, 5, 6, 7, 8, 9, 10, 11, and 12, illustrate Applicants' gripper assembly 300 moveably disposed within Applicants' pass-through accessor 110, and Applicants' method using pass-through accessor 120. Referring once again to FIG. 2B, Applicants' pass-through accessor comprises a housing 270 with two sets of parallel rails disposed within housing 270. A first set of parallel rails comprises rails 712 and 714. A second set of parallel rails comprises rails 716 and 718. For the sake of clarity, FIGS. 4, 5, 6, 7, 8, 9, 10, 11, and 12, show Applicants' gripper mechanism 300 moveably disposed on rails 712 and 714. Applicants' method illustrated in FIGS. 4, 5, 6, 7, 8, 9, 10, 11, and 12, can also be performed using Applicants' gripper mechanism 300 moveably disposed on rails 716 and 718.

Referring to FIG. 4, floor 750 partially connects rail 712 and rail 714. The area of open space 760, defined by end 752 of floor 750, distal end 713 of rail 712, and distal end 715 of rail 714, is greater than the foot print of a portable data storage cassette 180 (shown in dotted lines) attached to, and extending outwardly from, fixturing assembly 264.

FIGS. 4 and 5 show portable data storage cassette 180*a* removeably disposed in storage slot 102*a*. FIGS. 4 and 5 further show distal end 335 of gripping member 330 inserted into fixturing groove 183*a* (FIGS. 1B, 1C) and distal end 345 of gripping member 340 inserted into fixturing groove 183*b* (FIGS. 1B, 1C). Referring now to FIGS. 6 and 7, gripper assembly 300 pulls portable data storage cassette 180*a* outwardly from storage slot 102*a*, through front end 274 (FIGS. 2A, 2B), and into housing 270 (FIGS. 2A, 2B). Referring now to FIGS. 8 and 9, gripper assembly 300 then repositions itself such that distal end 385 of gripping member 380 is inserted into fixturing groove 184*a* (FIGS. 1B, 1C) and distal end 395 of gripping member 390 is inserted into fixturing groove 184*b* (FIGS. 1B, 1C). Referring now to FIGS. 10 and 11, gripper assembly 300 pushes portable data storage cassette 180*a* outwardly through rear 276 (FIGS. 2A, 2B) of housing 270 (FIGS. 2A, 2B) until portable data storage cassette 180*a* is attached to fixturing assembly 266 disposed on fixturing apparatus 260.

Applicants' invention comprises a method to audit a plurality of portable cassettes moveably disposed in an automated data library, such as for example automated data library 100 (FIG. 1A). FIG. 14 summarizes the steps of Applicants' method. Referring now to FIG. 14, in step 1405 the method supplies a data storage library, such as data storage library 100, comprising a plurality of storage slots, one or more portable cassettes disposed in one or more of the plurality of storage slots, and a pass-through accessor, such as pass-through accessor 110 and/or 120, comprising a sensor, a processor, and a moveable fixturing apparatus for storing portable cassettes.

In step 1410, the method receives an audit command. In certain embodiments, the audit command of step 1410 is generated by a host computer, such as host computer 190 (FIG. 1A), in communication with the data storage library of step 1405. In certain embodiments, the host computer provides the audit command to a library controller disposed in the data storage library of step 1405. In certain embodiments, a library controller provides the audit command to a processor disposed in the pass-through accessor of step 1405.

In certain embodiments, the audit command of step 1410 requests a listing of each portable cassette disposed in the data storage library of step 1405. In certain embodiments, the audit command of step 1410 requests a location for each portable cassette disposed in the data storage library of step 1405.

In step 1420, the method positions a pass-through accessor of step 1405 adjacent an open end of a designated storage slot. In certain embodiments, a host computer in communication with the data storage library designates the storage slot and causes the pass-through accessor to move adjacent that storage slot. In certain embodiments, a storage controller disposed in the data storage library designates the storage slot and causes the pass-through accessor to move adjacent that storage slot. In certain embodiments, a processor disposed in the pass-through accessor designates the storage slot and causes the pass-through accessor to move adjacent that storage slot.

In step 1430, the method reads a bar code disposed on a portable cassette disposed adjacent an open end of the designated storage slot, or wherein the method provides a RFID interrogation signal and receives a response signal comprising a unique identifier from a portable cassette disposed adjacent an open end of the designated storage slot. In certain embodiments, the pass-through accessor of step 1405 comprises a sensor, and in step 1430 that sensor reads a bar code disposed on a portable cassette disposed in the designate storage slot. In certain embodiments, the pass-through accessor of step 1405 comprises a RFID reader, and in step 1430 that RFID reader emits a RFID interrogation signal and receives a response signal comprising a unique identifier.

In certain embodiments in step 1440, the method decodes the bar code read in step 1430 to obtain an identifier for a portable cassette disposed in the designated storage slot. In certain embodiments, a sensor that reads the bar code in step 1430 decodes that bar code in step 1440. In other embodiments in step 1440, the method receives a RFID decodes a RFID response signal to obtain an identifier.

In step 1450, the method provides the identifier step 1440 to a processor disposed in the pass-through accessor of step 1405. In certain embodiments, in step 1430 the sensor of step 1405 wirelessly provides the identifier to the processor of step 1405.

In step 1460, the method removes the portable cassette disposed adjacent the open end of the designated storage slot, such as portable cassette 180*a* from storage slot 102*a*. In certain embodiments, the accessor of step 1405 comprises a vertical pillar comprising a first end and an opposing second end; a lifting servo section, wherein said lifting servo section is moveably disposed on said vertical pillar, and wherein said first end of said vertical pillar is attached to a carriage assembly moveably disposed in said data storage library; a set of parallel rails disposed on said lifting servo section; a gripper assembly, such as gripper assembly 300, moveably disposed on the set of parallel rails, wherein said gripper assembly comprises a first end, an opposing second end, one or more gripping mechanisms disposed on a first end, and one or more gripping mechanisms disposed on an opposing second end.

In certain embodiments, step 1460 comprises attaching the distal ends of a first and a second gripping member to a first set of fixturing grooves formed in the sides of a portable cassette, pulling by a gripper assembly 300 the designated portable cassette outwardly from a designated storage slot, through an aperture formed in a housing disposed on the lifting servo section, and into that housing. In certain embodiments, step 1460 is illustrated in FIGS. 4, 5, 6, and 7.

In step 1470, the method attaches the removed portable cassette to a fixturing assembly disposed on the fixturing apparatus. In certain embodiments, step 1470 comprises attaching distal ends 385 (FIGS. 3B, 8) and 395 (FIGS. 3B, 8) of gripping members 380 and 390 (FIG. 3B), respectively, to a second set of fixturing grooves formed in the sides of the designated portable cassette, pushing that designated portable cassette outwardly through a rear of the housing and into the distal ends 266*a* (FIGS. 10) and 266*b* (FIG. 10) of a fifth gripping member 266*c* (FIG. 10) and sixth gripping member 266*d* (FIG. 10), wherein the fifth and sixth gripping members comprise a fixturing assembly comprising a portion of the moveable fixturing apparatus 260. In certain embodiments, step 1460 is illustrated in FIGS. 8, 9, 10, and 11.

In step 1480, the method moves the fixturing apparatus, such as fixturing apparatus 260, upwardly or downwardly. For example, in the illustrated embodiment of FIG. 12A fixturing assembly 260 has been moved upwardly such that fixturing assembly 267 is now disposed adjacent rail 714. In the illustrated embodiment of FIG. 12B fixturing assembly 260 has been moved downwardly such that fixturing assembly 265 is now disposed adjacent rail 714. In certain embodiments, step 1480 is performed by the processor of step 1405.

In step 1490, the method determines if there is another portable cassette disposed in the designated storage slot of step 1420. In certain embodiments, step 1490 is performed by the processor of step 1405. In certain embodiments, step 1490 is performed by the processor of step 1405 using the sensor/RFID reader of step 1405.

Figure 13A:
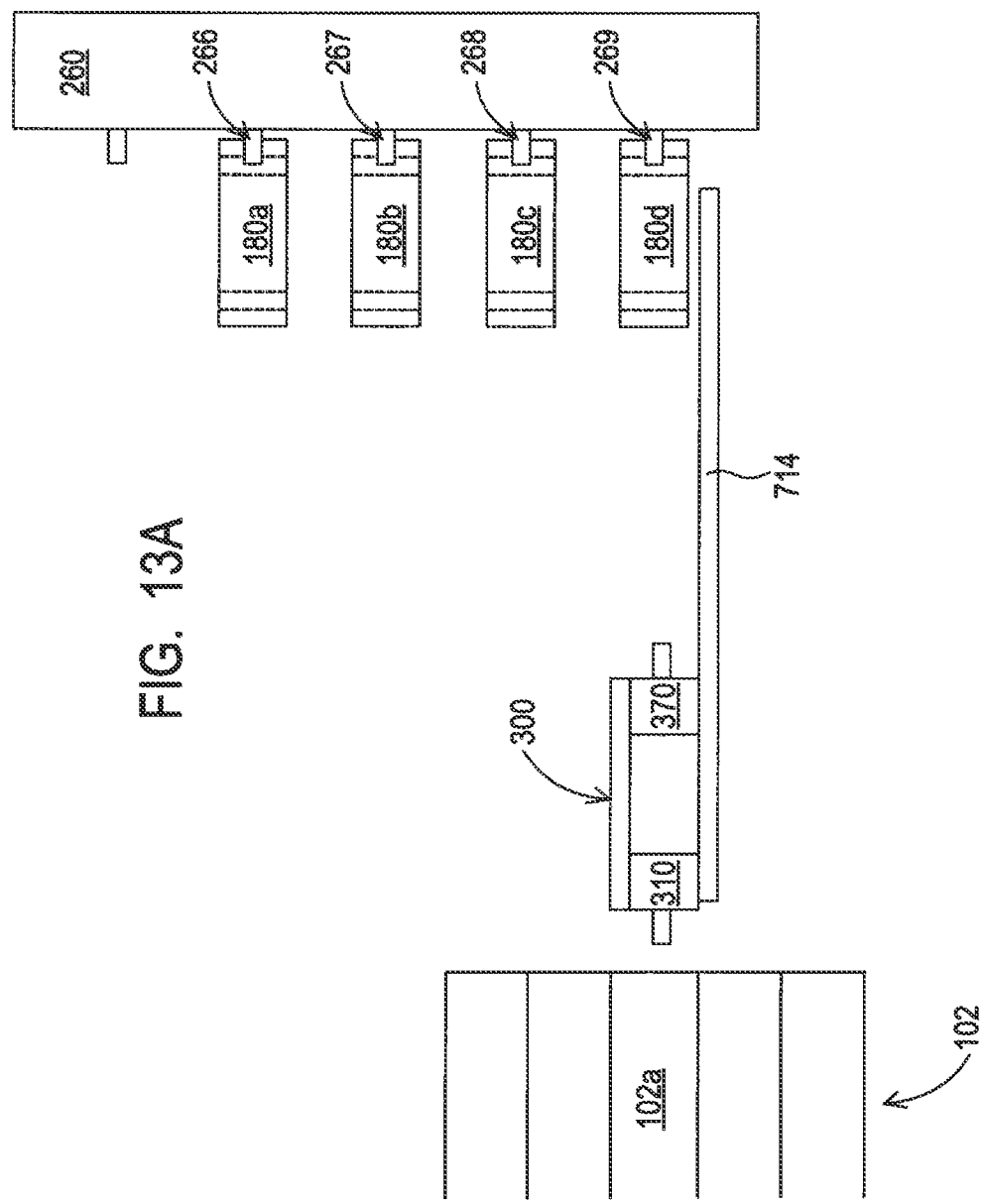
FIG. 13A shows the plurality of portable cassettes of FIG. 1D having been removed from storage slot 102(a) and each attached to a different fixturing assembly disposed on fixturing apparatus 260, wherein fixturing apparatus 260 was moved upwardly with each attachment operation.

If the method determines in step 1490 that there is another portable cassette disposed in the designated storage slot of step 1420, then the method transitions from step 1490 to step 1430 and continues as described herein. Applicants' method iterates through the steps of FIG. 14 until each of the portable cassettes has been removed from the storage slot of step 1420. For example, FIG. 13A shows portable cassettes 180*a*, 180*b*, 180*c*, and 180*d*, having been removed from storage slot 102(*a*), and attached to fixturing assemblies 266, 267, 268, and 269, respectively, wherein fixturing apparatus 260 was moved upwardly in each iteration of step 1480 (FIG. 14). FIG. 13B shows portable cassettes 180*a*, 180*b*, 180*c*, and 180*d*, having been removed from storage slot 102(*a*), and attached to fixturing assemblies 266, 267, 268, and 269, respectively, wherein fixturing apparatus 260 was moved downwardly in each iteration of step 1480 (FIG. 14).

If the method determines in step 1490 that there are no other portable cassette disposed in the designated storage slot of step 1420, then the method transitions from step 1490 to step 1510 (FIG. 15) wherein the method removes a portable cassette from the fixturing apparatus. In step 1520, the method inserts the removed portable cassette of step 1510 and reinserts that portable cassette into the storage slot of step 1420.

In certain embodiments, the portable cassettes attached to the fixturing device portion of the accessor are reinserted into the storage slot of step 1420 to recreate the original insertion order of cassettes. For example and referring once again to FIG. 1D, in an original insertion order portable cassette 180*a* is disposed adjacent an open end of storage slot 102*a*, portable cassette 180*b* is positioned behind and immediately adjacent an end of portable cassette 180*a*, portable cassette 180*c* is positioned behind and immediately adjacent an end of portable cassette 180*b*, and portable cassette 180*d* is positioned behind and immediately adjacent an end of portable cassette 180*c*.

In other embodiments, the portable cassettes attached to the fixturing device are reinserted into the storage slot in a new insertion order, wherein the new insertion order differs from the original insertion order. For example, such a new insertion order may comprise portable cassette 180*d* disposed adjacent open end of storage slot 102*a*, portable cassette 180*b* positioned behind and immediately adjacent an end of portable cassette 180*d*, portable cassette 180*c* positioned behind and immediately adjacent an end of portable cassette 180*b*, and portable cassette 180*a* positioned behind and immediately adjacent an end of portable cassette 180*c*.

In step 1530, the method moves the fixturing apparatus upwardly or downwardly. In step 1540, the method determines if one or more portable cassettes remain attached to the fixturing apparatus. If the method determines in step 1540 that one or more portable cassettes remain attached to the fixturing apparatus, then the method transitions from step 1540 to step 1510 and continues as described herein. Alternatively, if the method determines in step 1540 that no portable cassettes remain attached to the fixturing apparatus, then the method transitions from step 1540 to step 1420 and continues as described herein.

In certain embodiments, Applicants' method inserts the portable cassettes previously removed from the storage slot of step 1420 in a reverse order, i.e. the last portable cassette removed is the first portable cassette re-inserted. In other embodiments, the portable cassettes are reinserted into the storage slot of step 1420 in a random order.

In certain embodiments, the individual steps shown in FIG. 14 may be combined, eliminated, or reordered.

Figure 15:
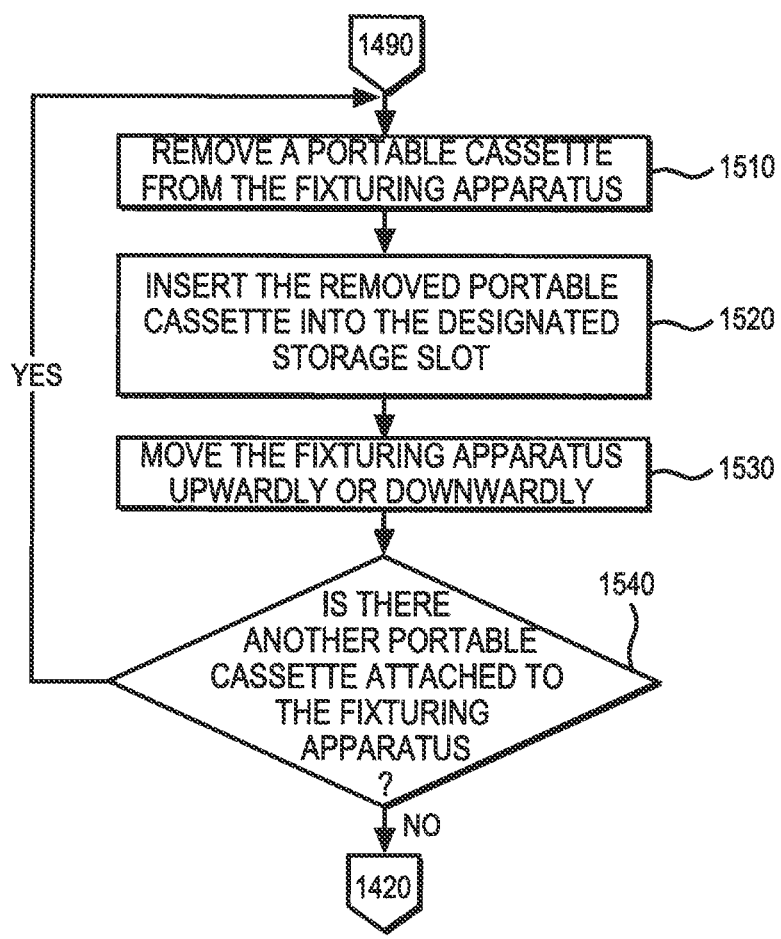
FIG. 15 summarizes certain additional steps in Applicants' method.

In certain embodiments, Applicants' invention includes instructions, such as instructions 196 (FIG. 1) and/or instructions 116 (FIG. 1), and/or instructions 126 (FIG. 1), encoded in a computer readable medium, such as computer readable medium 192 (FIG. 1) and/or 114 (FIG. 1), and/or 124 (FIG. 1), where those instructions are implemented by a processor, such as processor 191 (FIG. 1), and/or 112 (FIG. 1), and/or 122 (FIG. 1), to perform one or more of steps 1410, 1420, 1430, 1440, 1450, 1460, 1470, 1480, and 1490, recited in FIG. 14, and/or one or more of steps 1510, 1520, 1530, and/or 1540 recited in FIG. 15.

In other embodiments, Applicants' invention includes instructions residing in a computer program product, where those instructions are implemented by a processor external to, or internal to, data storage system 100, to perform one or more of steps 1410, 1420, 1430, 1440, 1450, 1460, 1470, 1480, and 1490, recited in FIG. 14, and/or one or more of steps 1510, 1520, 1530, and/or 1540 recited in FIG. 15. In either case, the instructions may be encoded in a computer readable medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage library, comprising:
a plurality of storage slots, a plurality of portable cassettes removeably disposed in one or more of said plurality of storage slots;
a pass-through accessor moveably disposed in said data storage library, wherein said pass-through accessor comprises a moveable fixturing apparatus comprising a plurality of fixturing assemblies;
wherein said moveable fixturing apparatus comprises a first fixturing assembly to removeably attach a first portable cassette and a second fixturing assembly to removeably attach a second portable cassette;
wherein said moveable fixturing apparatus can be moved upwardly or downwardly after attaching said first portable cassette thereto but before attaching said second portable cassette thereto.

2. The data storage library of claim 1, wherein said pass-through accessor further comprises:
a RFID reader;
wherein a first identifier is encoded in a first RFID tag disposed on said first portable data cassette, and a second identifier is encoded in a second RFID tag disposed on said second portable data cassette.

3. The data storage library of claim 1, wherein said pass-through accessor further comprises:
a bar code scanner;
a computer readable medium; and
a processor.

4. The data storage library of claim 1, wherein said pass-through accessor further comprises:
a vertical pillar comprising a first end and an opposing second end
a lifting servo section, wherein said lifting servo section is moveably disposed on said vertical pillar, and wherein said first end of said vertical pillar is attached to a carriage assembly moveably disposed in said data storage library;
a set of parallel rails disposed on said lifting servo section;
a gripper assembly moveably disposed on said set of parallel rails, wherein said gripper assembly comprises a first end, an opposing second end, a first gripping mechanism disposed on said first end, a second gripping mechanism disposed on said first end, a third gripping mechanism disposed on said second end, and a fourth gripping mechanism disposed on said second end;
wherein said fixturing apparatus can be moved upwardly and downwardly along said vertical pillar.

5. A pass-through accessor, comprising a moveable fixturing apparatus comprises a first fixturing assembly to removeably attach a first portable cassette and a second fixturing assembly to removeably attach a second portable cassette;
wherein said moveable fixturing apparatus can be moved upwardly or downwardly after attaching said first portable cassette thereto but before attaching said second portable cassette thereto.

6. The pass-through accessor of claim 5, wherein said pass-through accessor further comprises:
a RFID reader;
wherein a first identifier is encoded in a first RFID tag disposed on said first portable data cassette, and a second identifier is encoded in a second RFID tag disposed on said second portable data cassette.

7. The pass-through accessor of claim 5, wherein said pass-through accessor further comprises:
a bar code scanner;
a computer readable medium; and
a processor.

8. The pass-through accessor of claim 5, wherein said pass-through accessor further comprises:
a vertical pillar comprising a first end and an opposing second end
a lifting servo section, wherein said lifting servo section is moveably disposed on said vertical pillar, and wherein said first end of said vertical pillar is attached to a carriage assembly moveably disposed in said data storage library;
a set of parallel rails disposed on said lifting servo section;
a gripper assembly moveably disposed on said set of parallel rails, wherein said gripper assembly comprises a first end, an opposing second end, a first gripping mechanism disposed on said first end, a second gripping mechanism disposed on said first end, a third gripping mechanism disposed on said second end, and a fourth gripping mechanism disposed on said second end;
wherein said fixturing apparatus can be moved upwardly and downwardly along said vertical pillar.

\* \* \* \* \*